United States Patent
Tsao

(10) Patent No.: US 7,342,933 B2
(45) Date of Patent: Mar. 11, 2008

(54) PACKET DELIVERY METHOD FOR PACKET RADIO NETWORKS

(75) Inventor: Shiao-Li Tsao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1138 days.

(21) Appl. No.: 10/315,138

(22) Filed: Dec. 10, 2002

(65) Prior Publication Data

US 2003/0198211 A1     Oct. 23, 2003

(30) Foreign Application Priority Data

Apr. 19, 2002    (TW) .............................. 91108069 A

(51) Int. Cl.
 *H04L 12/56* (2006.01)
(52) U.S. Cl. ...................... 370/401; 370/328
(58) Field of Classification Search ................ 370/469, 370/331, 392, 352, 338
See application file for complete search history.

(56) References Cited

U.S. PATENT DOCUMENTS

| | | | | |
|---|---|---|---|---|
| 6,233,458 B1* | 5/2001 | Haumont et al. | ........... | 455/445 |
| 6,636,502 B1* | 10/2003 | Lager et al. | ............... | 370/352 |
| 6,658,011 B1* | 12/2003 | Sevanto et al. | ............. | 370/401 |
| 6,728,208 B1* | 4/2004 | Puuskari | .................... | 370/230.1 |
| 6,937,566 B1* | 8/2005 | Forslow | ........................ | 370/231 |
| 7,023,825 B1* | 4/2006 | Haumont et al. | ........... | 370/338 |
| 7,167,447 B2* | 1/2007 | Puuskari et al. | ............ | 370/231 |
| 2002/0032800 A1* | 3/2002 | Puuskari et al. | ............ | 709/246 |
| 2002/0080819 A1* | 6/2002 | Tsao | ............................ | 370/469 |
| 2002/0097709 A1* | 7/2002 | Haumont et al. | ........... | 370/352 |
| 2002/0181448 A1* | 12/2002 | Uskela et al. | ................. | 370/352 |
| 2003/0043762 A1* | 3/2003 | Pang et al. | .................. | 370/328 |
| 2003/0081607 A1* | 5/2003 | Kavanagh | ..................... | 370/392 |
| 2003/0086395 A1* | 5/2003 | Shanbhag | ..................... | 370/331 |
| 2003/0112793 A1* | 6/2003 | Sengodan | ..................... | 370/352 |
| 2006/0126547 A1* | 6/2006 | Puuskari et al. | ............. | 370/310 |
| 2006/0133315 A1* | 6/2006 | Eriksson et al. | ............. | 370/331 |

OTHER PUBLICATIONS

Xenakis et al. (On demand network-wide VPN deployment in GPRS; Network, IEEE vol. 16, Issue 6, Nov.-Dec. 2002 pp. 28-37).*

(Continued)

*Primary Examiner*—Edan Orgad
*Assistant Examiner*—Salman Ahmed
(74) *Attorney, Agent, or Firm*—Birch, Stewart, Kolasch & Birch, LLP

(57) ABSTRACT

A packet delivery method for packet radio networks. The method used to deliver packets between a first mobile station and a second mobile station in a packet radio network is characterized by, when the first mobile station has a plurality of data packets to the second mobile station, establishing a delivery path from the first mobile station (MS) to the second mobile station (MS) through a first base station system (BSS), a first Serving GPRS Support Node (SGSN), a second Serving GPRS Support Node (SGSN) and a second base station system (BSS); and when the second mobile station has a plurality of data packets to the first mobile station, the delivery path is established from the second mobile station (MS) to the first mobile station (MS) through the second base station system (BSS), the second Serving GPRS Support Node (SGSN), the first Serving GPRS Support Node (SGSN) and the first base station system (BSS).

17 Claims, 12 Drawing Sheets

OTHER PUBLICATIONS

Jeong-Hyun Park; (Wireless Internet access for mobile subscribers based on the GPRS/UMTS network; Communications Magazine, IEEE vol. 40, Issue 4, Apr. 2002 pp. 38-49).*

Chaudhury, P.; Mohr, W.; Onoe, S. (The 3GPP proposal for IMT-2000; Communications Magazine, IEEE vol. 37, Issue 12, Dec. 1999 pp. 72-81).*

Tsao, Shiao-Li et al., "Performance Improvement of GPRS/UMTS Core Network," Mobile Computing 2002: The 8th Mobile Computing Workshop, Mar. 22, 2002, pp. 97-103.

* cited by examiner

PACKET DELIVERY METHOD FOR PACKET RADIO NETWORKS

BACKGROUND OF THE INVENTION

1. Field of the Invention

The present invention relates to a routing method, and especially to a method for optimizing packet delivery between two mobile stations (MSs) in packet radio networks.

2. Description of the Related Art

Wireless mobile communication has developed rapidly in recent years. A new requirement for the third generation is to carry out roaming functions. The roaming content can include not only voice but also video and data transmission, requiring wideband data communication capability. Also important is connection to existing networks by method of a third generation cellular phone to utilize available resources. For this purpose, mobile communication networks are combined with fixed data communication networks. The Internet protocol (IP) is defined for communication between mobile communication networks and fixed data communication networks to play an important role in switching data, video, multimedia information and so on.

IP adopts packet switching in data processing and therefore wireless communication protocol with packet switching such as General Packet Radio Service (GPRS) and Universal Mobile Telecommunication System (UMTS) has been developed. The cited packet radio networks defined by the wireless communication protocol replace circuit switching in conventional data processing with packet switching such that mobile stations (MSs) can go online to the Internet and communicate with hosts connected to the Internet. For embodied explanation of packet radio networks, a GPRS example is given in the following.

FIG. 1 is a schematic diagram of a typical GPRS Public Land Mobile Network (PLMN) architecture and packet delivery path for a communication between an MS and the Internet host (i.e., a MS-to-Host communication). In FIG. 1, the network 100 includes Gateway GPRS Support Node (GGSN) 12, Serving GPRS Support Nodes (SGSNs) 14a~14c, base station subsystems (BSSs) 16a-16g and mobile station (MS) 18, wherein GGSN 12 is an interface between the Internet 110 and the network 100. MS 18 can have bidirectional communication with the host 20 on the Internet 110. When MS 18 has data packets to the host 20, MS 18 must connect to the network 100 first. Thus, SGSN 14a in the network 100 can record a current position message of MS 18 and receive and forward data packets between MS 18 and GGSN 12. GGSN 12 can deliver packets forwarded by SGSN 14a to external networks with TCP/IP protocol. As an example, packets here are forwarded to the host 20 on the Internet 110. Also, when the host 20 on the Internet 110 has packets to MS 18, the packets are forwarded from the Internet 110 to SGSN 14a in GPRS 100 through GGSN 12 and further forwarded from SGSN 14a to MS 18 through BSS 16a.

According to GPRS protocol structure, GGSN is the first node understanding the Internet Protocol (IP) of the MS-to-Host communication. In other words, GGSN 12 in this example is the first hub for every packet regardless of packet destination. Therefore, every packet from MS 18 must go to GGSN 12 first. Considering a GPRS may provide mobile station-to-mobile station packet service, that is, MS-to-MS communication, the destination of packets may be in the same base station subsystem (BSS) or SGSN. The former is shown in FIG. 2a and the latter is shown in FIG. 2b.

FIG. 2a is a schematic diagram of the MS-to-MS communication when two MSs are in the same BSS. In FIG. 2a, GPRS 100 includes GGSN 12, SGSNs 14a~14c, BSSs 16a~16g and MSs 18a~18b, wherein GGSN 12 is an interface between the network 100 and the Internet 110 for providing communication between the host 20 on the Internet 110 and MSs 18a~18b in the network 100.

As shown in FIG. 2a, MSs 18a and 18b connect to the network 100 through BSS 16a in order to communicate with each other. When MS 18a has a packet to MS 18b, MS 18a forwards the packet, through BSS 16a, to SGSN 14a and to GGSN 12. Next, GGSN 12 forwards the packet to MS 18b through SGSN 14a and BSS 16a. Similarly, when MS 18b has a packet to MS 18a, a delivery path is from MS 18b to MS 18a through BSS 16a, SGSN 14a, GGSN 12, SGSN 14a and BSS 16a. A GPRS routing design as cited lacks efficiency.

FIG. 2b is a schematic diagram of the MS-to-MS communication when two MSs are in the same SGSN but different BSSs. In FIG. 2b, the architecture of GPRS 100 is similar to FIG. 2a except that MSs 18a and 18b connect to the network 100 through different BSSs 16a and 16c, respectively in the same SGSN 14a. As shown in FIG. 2b, when MS 18a has a packet to MS 18b, MS 18a forwards the packet, through BSS 16a, to SGSN 14a and to GGSN 12. Next, GGSN 12 forwards the packet, through SGSN 14a, to BSS 16c and to MS 18b. Similarly, when MS 18b has a packet to MS 18a, a delivery path is from MS 18b to MS 18a through BSS 16c, SGSN 14a, GGSN 12, SGSN 14a and BSS 16a. Obviously, this GPRS routing design also lacks efficiency.

FIG. 2c is a schematic diagram of the MS-to-MS communication when two MSs are in different SGSNs. In FIG. 2c, the architecture of GPRS 100 is similar to FIG. 2a except that MSs 18a and 18b are serviced by different SGSNs 14a and 14b. MS 18a connects to the network 100 through BSS 16a and is serviced by SGSN 14a. MS 18b connects to the network 100 through BSS 16d and is serviced by SGSN 14b. As shown in FIG. 2c, when MS 18a has a packet to MS 18b, MS 18a forwards the packet, through BSS 16a, to SGSN 14a and to GGSN 12. Next, GGSN 12 forwards the packet, through SGSN 14b, to BSS 16d and to MS 18b. Similarly, when MS 18b has a packet to MS 18a, a delivery path is from MS 18b to MS 18a through BSS 16d, SGSN 14b, GGSN 12, SGSN 14a and BSS 16a. Again, this path lacks efficiency.

Accordingly, the above-cited designs for delivery paths are not optimized based on GPRS because all packet delivery has to pass through GGSN 12, decreasing the overall performance of the GPRS networks and introduces end-to-end delay for MS-to-MS communications.

SUMMARY OF THE INVENTION

Accordingly, an object of the invention is to provide a packet delivery method for packet radio networks, which divides delivered packets between two mobile stations into data packets and signal packets (that maintain and end data packet delivery) with different delivery methods, such that packets between the two mobile stations are efficiently delivered and accordingly the inventive method can increase the overall performance of packet radio networks and reduce end-to-end delay for MS-to-MS communications. The inventive method can be adapted to, for example, General Packet Radio Service (GPRS) network or Universal Mobile Telecommunication System (UMTS) network.

To achieve the above purpose, the invention provides a packet delivery method for packet radio networks. In the inventive method, when the first mobile station has a plurality of data packets to the second mobile station, a delivery path is established from the first mobile station (MS) to the second mobile station (MS) through a first base station system (BSS), a first Serving GPRS Support Node (SGSN), a second Serving GPRS Support Node (SGSN) and a second base station system (BSS); when the second mobile station has a plurality of data packets to the first mobile station, a delivery path is established from the second mobile station (MS) to the first mobile station (MS) through the second base station system (BSS), the second Serving GPRS Support Node (SGSN), the first Serving GPRS Support Node (SGSN) and the first base station system (BSS); and delivering a plurality of signal packets by method of a GGSN, wherein the signal packets maintain and end data packets delivered between the first and second mobile station.

In addition, the method, when the first mobile station has the plurality of signal packets to the second mobile station, further establishes the delivery path from the first mobile station (MS) to the second mobile station (MS) through the first base station system (BSS), the first Serving GPRS Support Node (SGSN), a GGSN, the second Serving GPRS Support Node (SGSN) and the second base station system (BSS); when the second mobile station has the plurality of signal packets to the first mobile station, the delivery path is established from the second mobile station (MS) to the first mobile station (MS) through the second base station system (BSS), the second Serving GPRS Support Node (SGSN), the GGSN, the first Serving GPRS Support Node (SGSN) and the first base station system (BSS). The signal packets maintain and end data packets delivered between the first and second mobile station by method of the GGSN.

DETAILED DESCRIPTION OF THE INVENTION

The invention discloses a packet delivery method for packet radio networks, which divides delivered packets between two mobile stations into data packets and signal packets (that maintain and end data packet delivery). According to the invention, data packet delivery is improved but signal packet delivery adopts the prior method because signal packets are fewer than data packets, such that packets between the two mobile stations are effectively delivered. Accordingly, the inventive method can increase the overall performance of packet radio networks and reduce end-to-end delay for MS-to-MS communications. The following embodiments are described in detail with reference to the figures.

Figure 3:
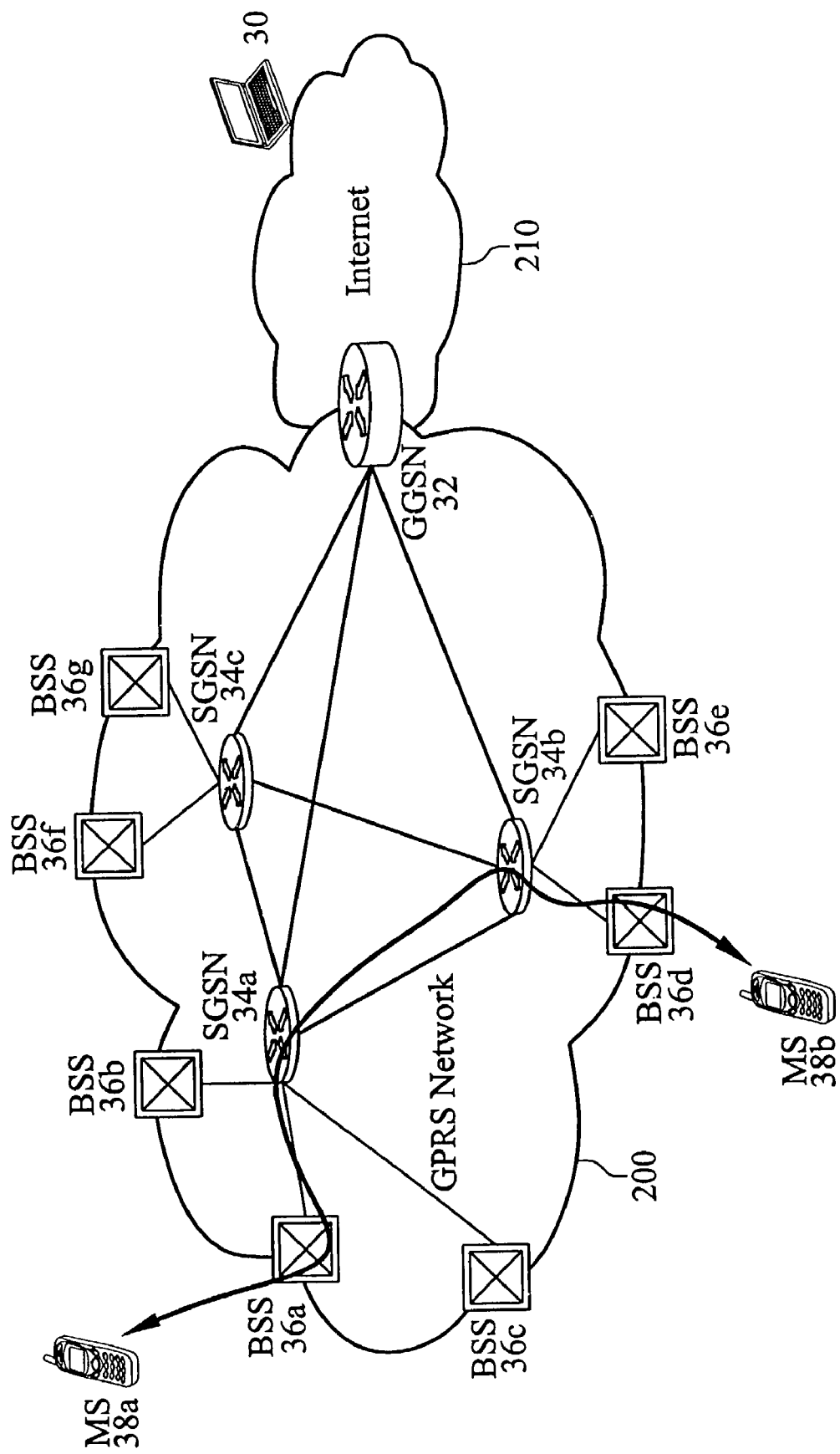
FIG. 3 is a first embodiment of an inventive MS-to-MS communication when MSs are in different SGSNs based on the typical GPRS network.

FIG. 3 is a first embodiment of an inventive MS-to-MS communication when MSs are in different SGSNs based on the typical GPRS network. In FIG. 3, the General Packet Radio Service (GPRS) network 200 includes Gateway GPRS Support Node (GGSN) 32, Serving GPRS Support Nodes (SGSNs) 34a~34c, base station subsystems (BSSs) 36a~36gand mobile stations (MSs) 38a~38b, wherein GGSN 32 is an interface between an external network, for example the Internet 210, and the network 200. The external network can be a TCP/IP or X.25 network. Thus, MSs in the GPRS network 200 can communicate with a host 30 on the Internet 210.

Figure 1:
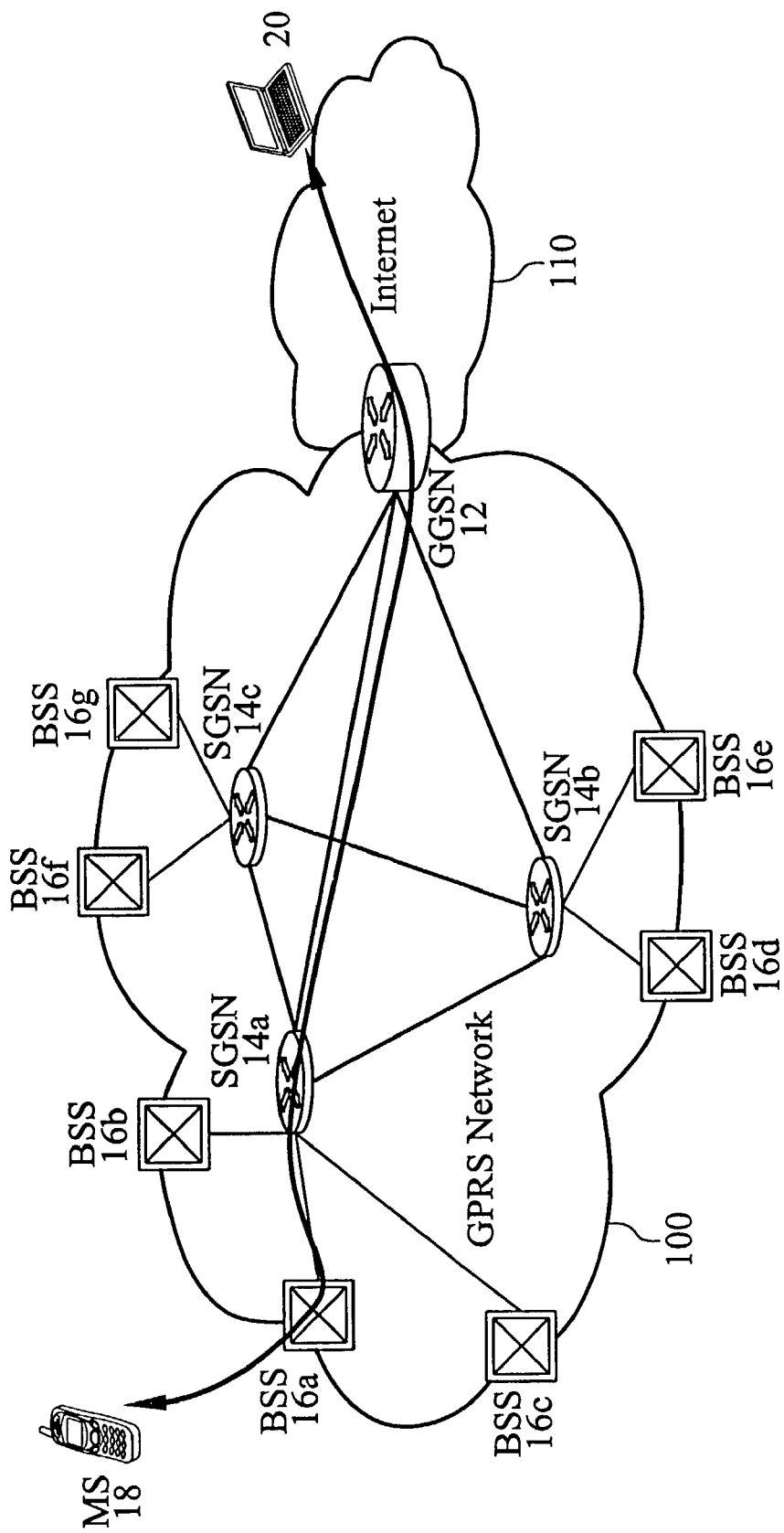
FIG. 1 is a schematic diagram of a mobile station to the Internet host communication in a typical GPRS network.
Figure 2A:
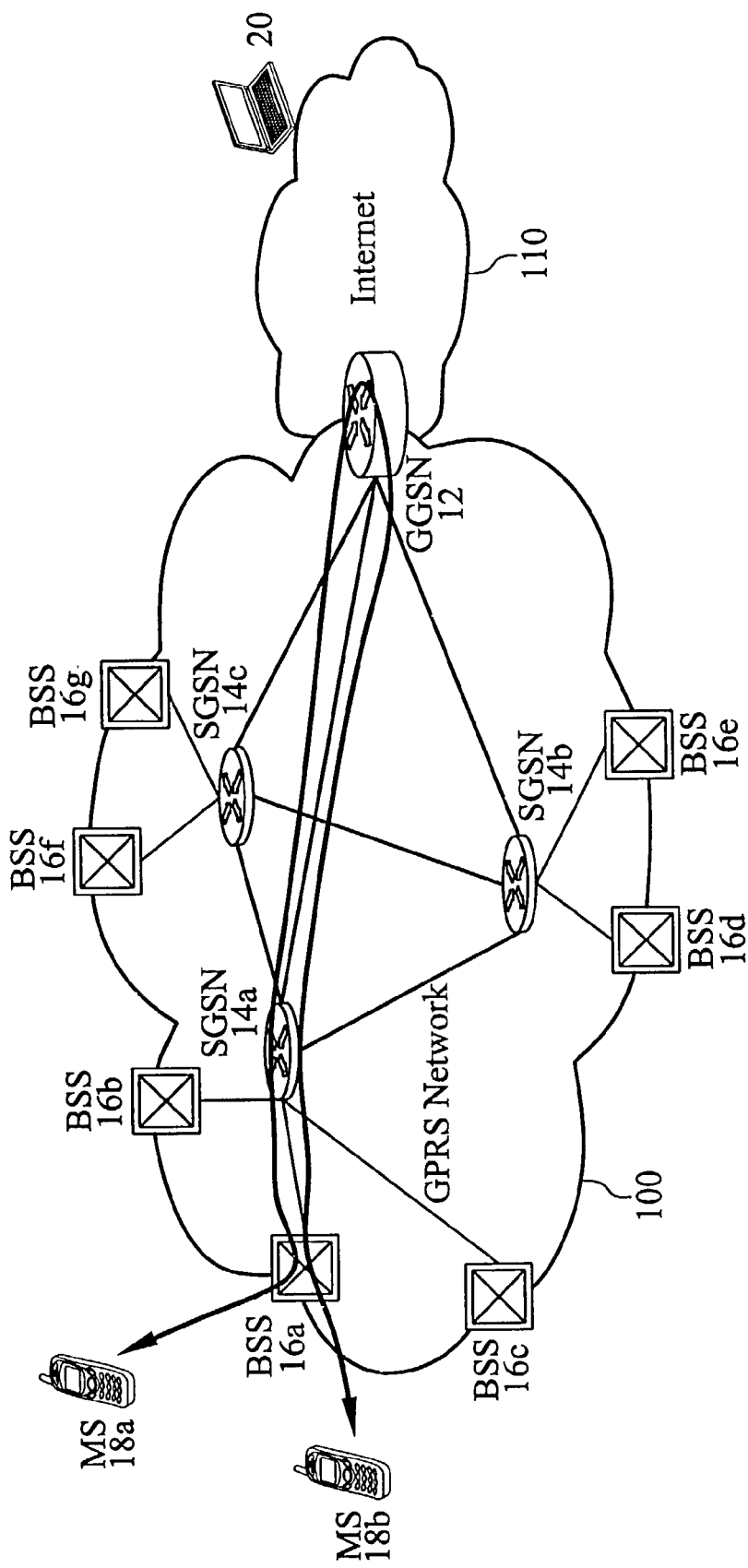
FIG. 2a is a schematic diagram of a packet delivery path of an MS-to-MS communication in the typical GPRS network of FIG. 1 when MSs are in the same BSSs.
Figure 2B:
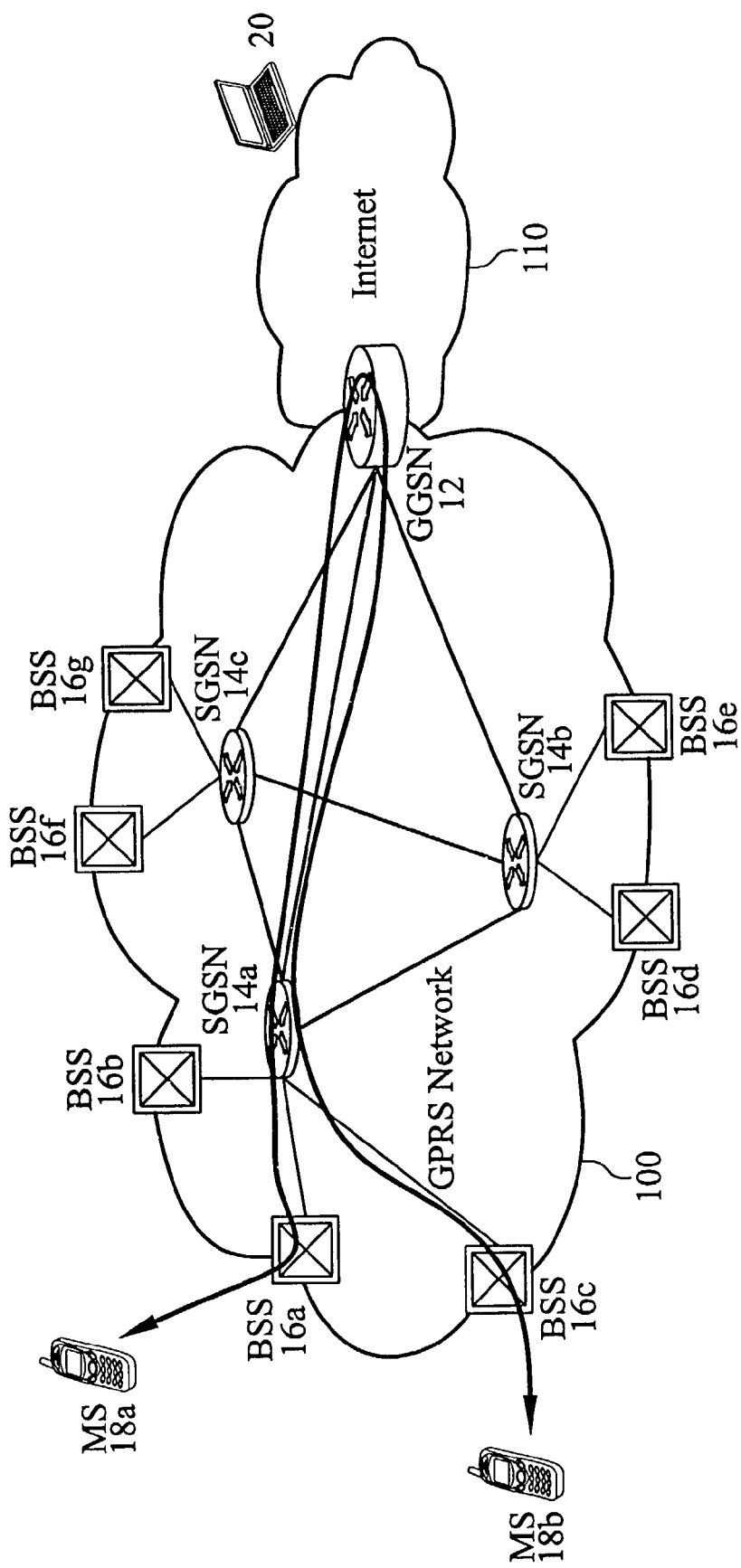
FIG. 2b is a schematic diagram of the MS-to-MS communication of FIG. 2a when MSs are in the same SGSN but in different BSSs.
Figure 2C:
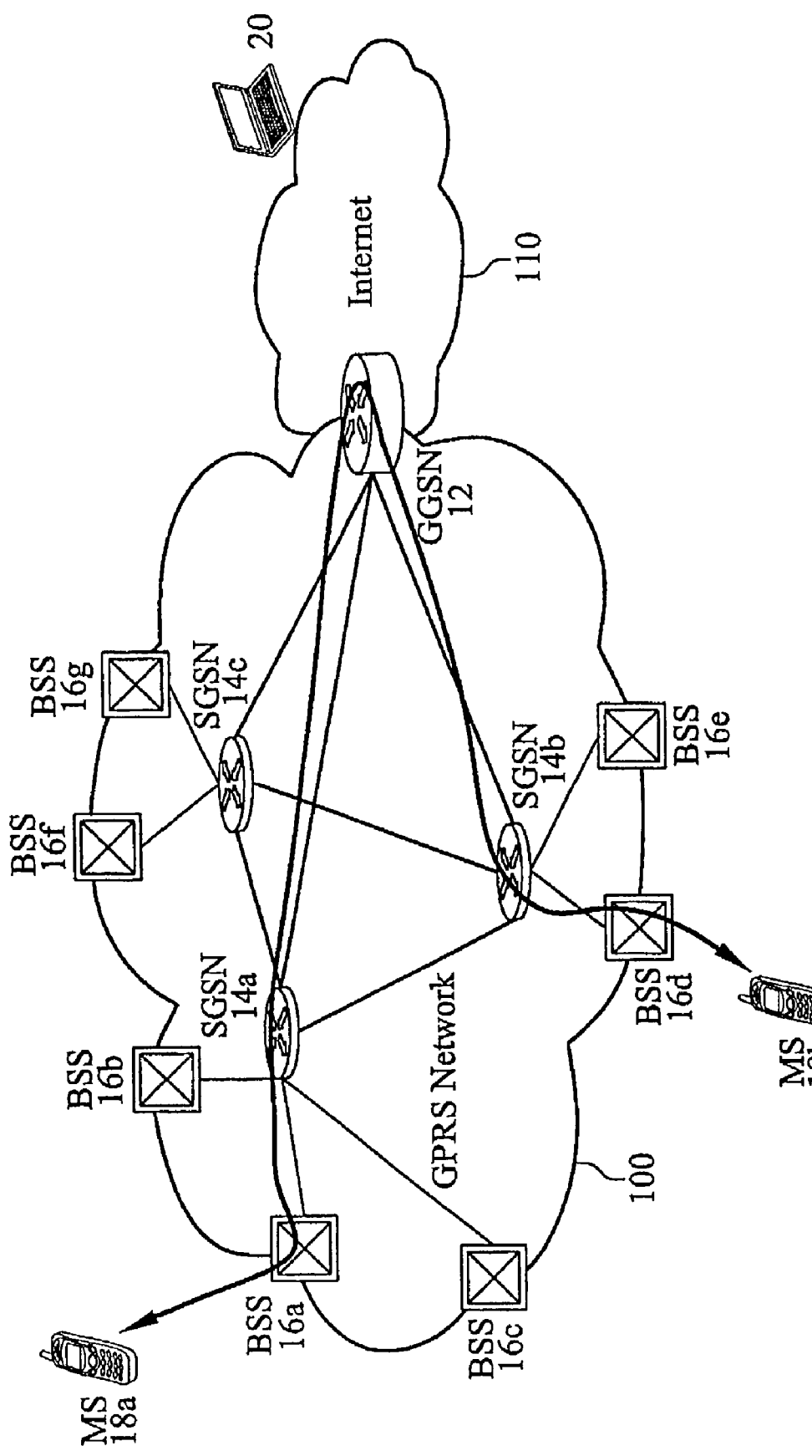
FIG. 2c is a schematic diagram of the MS-to-MS communication of FIG. 2a when MSs are in different SGSNs.

As shown in FIG. 3, MS 38a connects to the network 200 through BSS 36a and is serviced by SGSN 34a. MS 38b connects to the network 200 through BSS 36d and is serviced by SGSN 34b. After an initiation between MSs 38a and 38b is completed (see FIG. 4a), a bidirectional communication between MSs 38a and 38b is established. When MS 38a has a packet to MS 38b, MS 18a forwards the packet to SGSN 34a through BSS 36a. Next, SGSN 34a forwards the packet to MS 38b through SGSN 34b and BSS 36d. Similarly, when MS 38b has a packet to MS 38a, the delivery path is from MS 38b to MS 38a through BSS 36d, SGSN 34b, SGSN 34a and BSS 36a. The GPRS routing cited is more effective than that in FIG. 2c.

Figure 5:
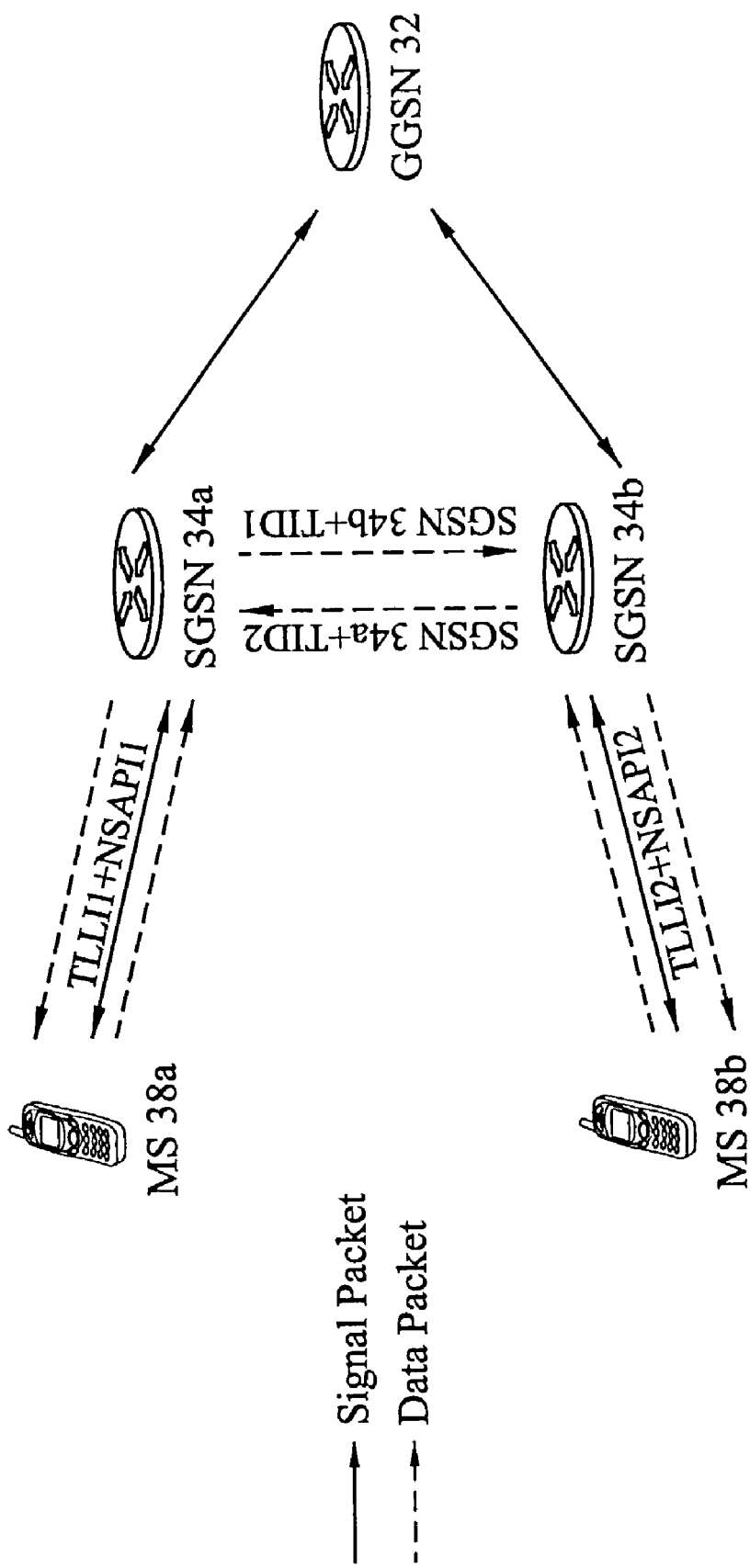
FIG. 5 is a flowchart of end-to-end data and signal links after a successful MS-to-MS call initiation according to the invention.

In this embodiment, it is noted that a signal packet is sent by a GGSN 34 to maintain and end the bidirectional communication between MSs 38a and 38b (see FIG. 5).

Figure 4A:
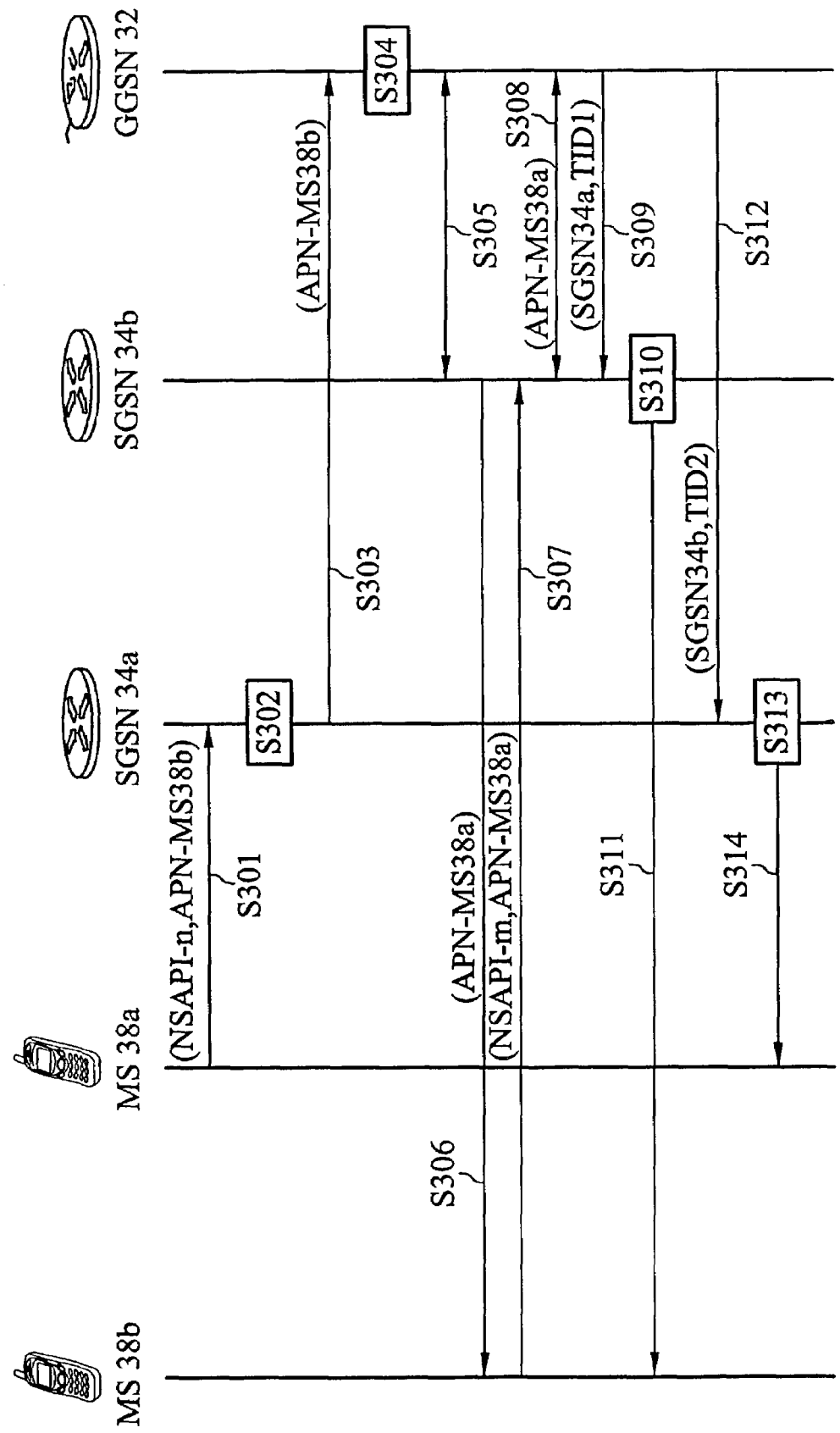
FIG. 4a is a flowchart of successful initiation procedures of an MS-to-MS call according to the invention.

FIG. 4a is a flowchart of successful initiation procedures of an MS-to-MS call according to the invention. As shown in FIG. 4a, initiation procedures are established first. After completion, GGSN 32 provides the address of SGSN 34a servicing MS 38a to SGSN 34b servicing MS 38b. GGSN 32 also provides the address of SGSN 34b servicing MS 38b to SGSN 34a servicing MS 38a. Detailed procedures are listed below:

It is noted that when MS 38a connects to the network 200 through BSS 36a and is serviced by SGSN 34a or MS 38b connects to the network 200 through BSS 36d and is serviced by SGSN 34b, messages delivered between MSs 38a and 38b or SGSNs 34a and 34b in the network 200 have to pass through BSSs 36a and 36d. However, FIGS. 4a and 4b omit this in this embodiment.

In order to establish an MS-to-MS initiation, MS 38a uses a new Network Layer Service Assess Point Identifier (NSAPI) NSAPI-n and specifies MS 38b identifier (APN-MS38b) in Access Point Name (APN) to activate a message (NSAPI-n, APN-MS38b) of Packet Data Protocol (PDP) Context Activation Request with NSAPI-n and APN-MS38b and send the message (NSAPI-n, APN-MS38b) to SGSN 34a (S301).

SGSN 34*a* receives the message (NSAPI-n, APN-MS38*b*) from MS 38*a* and learns from the received message that MS 38*a* is requesting an MS-to-MS call to MS 38*b* (S302), and thus SGSN 34*a* sends a message (APN-MS38*b*) of PDP Context Request to GGSN 32 (S303).

GGSN 32 receives the message (APN-MS38*b*) and gets the MS identifier to be initiated, i.e., MS 38*b* extracted from the message (APN-MS38*b*). GGSN 32 accordingly searches for the status of whether or not MS 38*b* is attached to the GPRS network (S304). When MS 38*b* has attached to the GPRS network, GGSN 32 sends a notify message to SGSN 34*b* (S305).

When SGSN 34*b* receives the notify message, MS 38*b* currently connects to the GPRS network but is not ready for a bidirectional communication between MSs. As such, SGSN 34*b* sends a message (APN-MS 38*a*) of PDP Context Request with MS 38*a* identifier (APN-MS38*a*) in APN (S306) in order to force MS 38*b* to activate a new PDP context, named Request PDP Context Activation.

MS 38*b* receives the new PDP context. If MS 38*b* accepts MS 38*a*'s request, it then uses a new NSAPI (NSAPI-m), specifies MS 38*a* identifier (APN-MS38*a*) and sends a message (NSAPI-m, APN-MS38*a*) of PDP Context Activation Request to SGSN 34*b* (S307).

SGSN 34*b* receives the message and sends a message (APN-MS38*a*) to GGSN 32 (S308).

GGSN 32 receives the message (APN-MS38*a*) and recognizes that MS 38*b* accepts MS 38*a*'s MS-to-MS call and thus establishes the initiation between MSs 38*a* and 38*b*. At this point, GGSN 32 sends a message (SGSN34*a*, TID1) of Create PDP Context Response with a new tunneling identifier (TID) TID1 and MS 38*a*'s SGSN address to MS 38*b* (S309). Next, SGSN 34*b* stores the SGSN 34*a*'s address and the identifier TID1 that defines communication packets from MS 38*a* (S310) and then notifies MS 38*b* to start the bidirectional communication (S311). GGSN 32 also sends a message (SGSN34*b*, TID2) to notify the SGSN 34*b*'s address and corresponding tunneling identifier TID2 to SGSN 34*a* (S312). Next, SGSN 34*a* stores the SGSN 34*b*'s address and the identifier TID2 that defines communication packets from MS 38*b* (S313). Finally, SGSN 34*a* notifies MS 38*a* that the initiation is completed and MS-to-MS packet delivery is currently available (S314). As a result, MS packets are delivered to destination SGSN instead of GGSN by method of the SGSN and TID information.

Figure 4B:
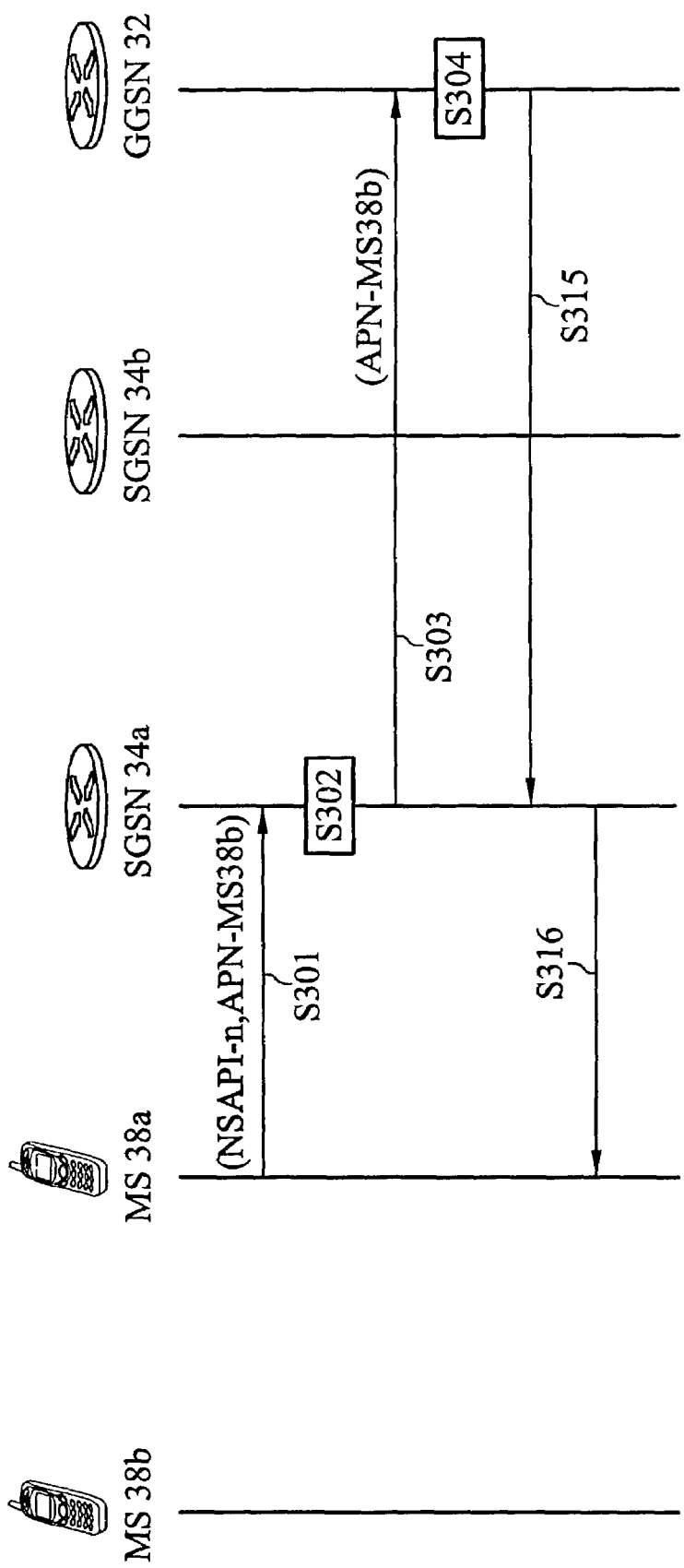
FIG. 4b is a flowchart of unsuccessful initiation procedures of an MS-to-MS call according to the invention.

FIG. 4*b* is a flowchart of unsuccessful initiation procedures of an MS-to-MS call according to the invention. As shown in FIG. 4*b*, In order to establish an MS-to-MS initiation, MS 38*a* uses a new Network Layer Service Assess Point Identifier (NSAPI) NSAPI-n and specifies MS 38*b* identifier (APN-MS38*b*) in Access Point Name (APN) to activate a message (NSAPI-n, APN-MS38*b*) of Packet Data Protocol (PDP) Context Activation Request with NSAPI-n and APN-MS38*b* and send the message (NSAPI-n, APN-MS38*b*) to SGSN 34*a* (S301). SGSN 34*a* receives the message (NSAPI-n, APN-MS38*b*) from MS 38*a* and learns from the received message that MS 38*a* is requesting an MS-to-MS call to MS 38*b* (S302), and thus SGSN 34*a* sends a message (APN-MS38*b*) of PDP Context Request to GGSN 32 (S303). GGSN 32 receives the message (APN-MS38*b*) and gets the MS identifier to be initiated, i.e., MS 38*b* is extracted from the message (APN-MS38*b*). GGSN 32 accordingly determines whether MS 38*b* is attached to the GPRS network (S304). When MS 38*b* is not attached to the GPRS network, GGSN 32 sends a notify message to SGSN 34*a* that the initiation has failed (S315). SGSN 34*a* sends a failure message to MS 38*a* after it receives the notify message (S316).

FIG. 5 is a flowchart of end-to-end data and signal links after a successful MS-to-MS call initiation according to the invention. In FIG. 5, dotted lines are data packets forwarding and solid lines are signal packets forwarding.

As shown in FIG. 5, during the end-to-end links, packets sent by MS 38*a* include data packets and signal packets. MS 38*a* first sends signal packets to GGSN 32 through SGSN 34*a* and then GGSN 32 sends signal packets to MS 38*b* through SGSN 34*b*. Signal packets have the same routing path as the prior GPRS routing path. Signal packets maintain and end bidirectional communications between MSs 38*a* and 38*b*. Additionally, MS 38*a* sends data packets with the identifier TID1 to SGSN 34*a*. When SGSN 34*a* receives data packets and perceives that data packets are packets communicated between MSs, SGSN 34*a* forwards data packets with TID1 to SGSN 34*b*. SGSN 34*b* then converts TID1 into both, a linking identifier TLLI2 between SGSN34*b* and MS 38*b* and the identifier NSAPI2, and sends the converted identifiers TLLI2+NSAPI2 to MS 38*b*.

Similarly, during the end-to-end links, packets sent by MS 38*b* include data packets and signal packets. MS 38*b* first sends signal packets to GGSN 32 through SGSN 34*b* and then GGSN 32 sends signal packets to MS 38*a* through SGSN 34*a*. Signal packets have the same routing path as the prior GPRS routing path. Signal packets maintain and end bidirectional communications between MSs 38*a* and 38*b*. Additionally, MS 38*b* sends data packets with the identifier TID2 to SGSN 34*b*. When SGSN 34*b* receives data packets and perceives that data packets are packets communicated between MSs, SGSN 34*b* forwards data packets with TID2 to SGSN 34*a*. SGSN 34*a* then converts TID2 into both a linking identifier TLLI1 between SGSN34*a* and MS 38*a* and the identifier NSAPI1, and sends the converted identifiers TLLI1+NSAPI1 to MS 38*a*.

Figure 6:
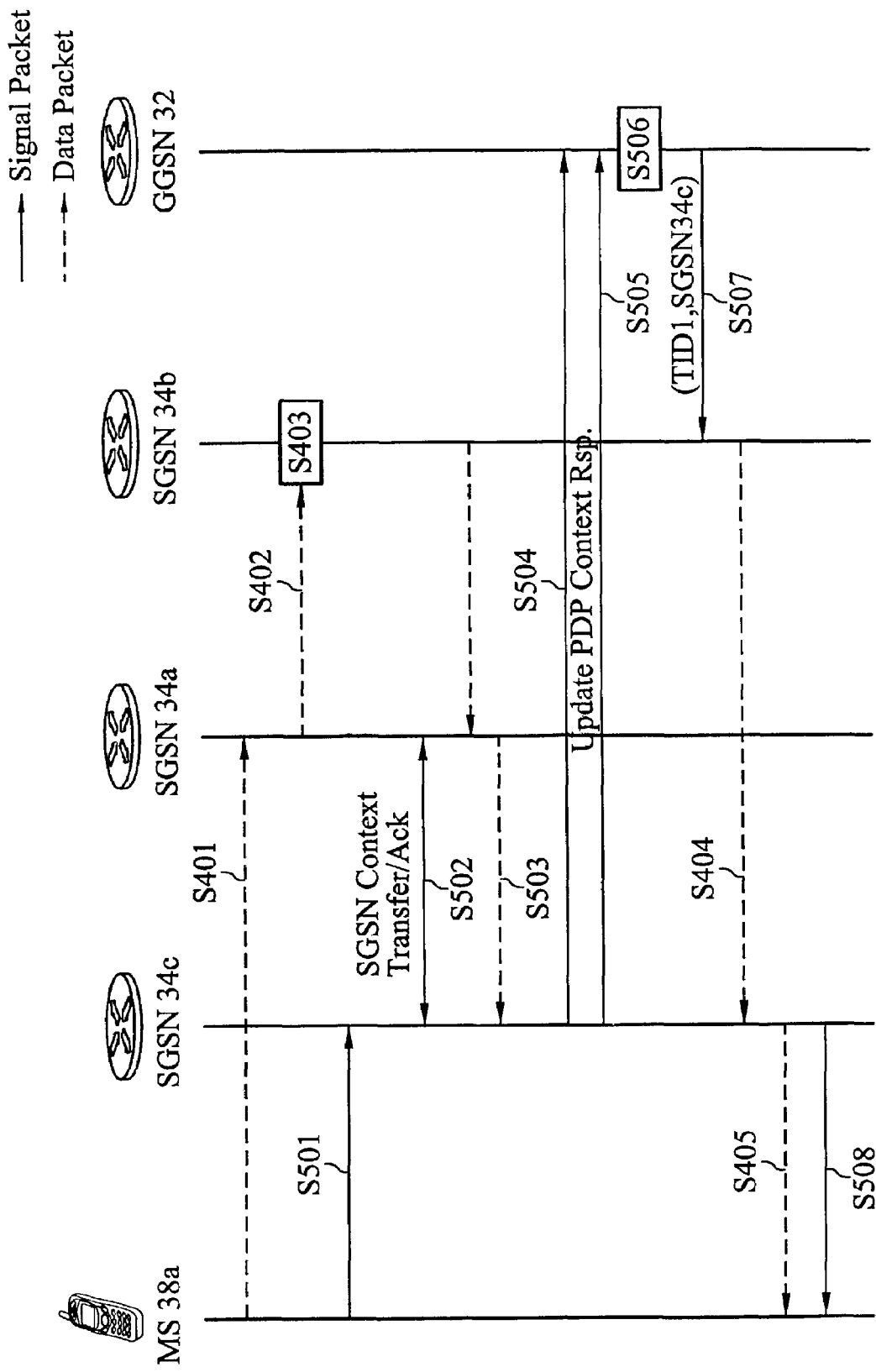
FIG. 6 is a flowchart of maintenance of an MS-to-MS packet path during the hand-off according to the invention.

FIG. 6 is a flowchart of maintenance of an MS-to-MS packet path during the hand-off according to the invention. Hand-off happens when an MS moves from an area serviced by an original SGSN to another area serviced by a new SGSN during the end-to-end links. At this point, the MS holds the bidirectional communication with another MS through the new SGSN. In FIG. 6, an example in which MS 38*a* is the MS from an area serviced by an original SGSN, e.g. 34*a*, to another area serviced by a new SGSN, e.g. 34*c*, is described, wherein dotted lines are data packets forwarding and solid lines are signal packets forwarding.

It is noted that when MS 38*a* connects to the network 200 through BSS 36*a* and is serviced by SGSN, messages delivered between MSs 38*a* and SGSN in the network 200 have to pass through BSSs 36*a*. However, FIG. 6 omits this in this embodiment.

MS 38*a* originally forwards packets through SGSNs 34*a* (S401) and 34*b* (S402). When SGSN servicing for MS 38*a* is changed, MS 38*a* notifies SGSN 34*c* to take SGSN 34*a*'s place for the services (S501).

SGSN 34*c*, receiving the notified message asks for corresponding linking information between MS 38*a* and another MS (i.e. MS 38*b*) and sends SGSN 34*b*'s address to SGSN 34*a* (S502). At this point, SGSN 34*a* forwards its stored packets, originally from SGSN 34*a* to MS 38*a*, to SGSN 34*c* (S503).

Next, SGSN 34*c* delivers a request message with PDP Context Request to GGSN 32 (S504).

GGSN, receiving the request message returns a response message of Update PDP Context Response to SGSN 34*c*

(S505) and concurrently updates end-to-end bidirectional link from SGSNs 34*a* and 34*b* to SGSNs 34*b* and 34*c* (S506). GGSN 32 after the updated link is complete sends SGSN 34*c*'s address to SGSN 34*b* (S507).

Also, data packets sent by S401 are temporarily stored by SGSN 34*a* until the end-to-end bidirectional link in S506 is updated (S402).

SGSN 34*b*, waiting to update the link, stores data packets received from MS 38*b* in internal storage (not shown) and does not forward any data packet to SGSN 34*a* (S403).

After the link is updated, GGSN 32 sends SGSN 34*c*'s address (using a message (TID1, SGSN34*c*)) to SGSN34*b* (S507). Next, SGSN 34*b* forwards all data packets stored in the storage and received from MS 38*b*, to SGSN 34*c* (S404) and further to MS 38*a* (S405).

At this point, SGSN 34*c* notifies MS 38*a* that the packet data delivery between MSs 38*a* and 38*b* respectively through SGSNs 34*c* and 34*b* can proceed (S508). Thus, an MS-to-MS call through different SGSNs is achieved.

The cited procedures of hand-off are also adapted for when SGSN servicing for MS 38*b*, not for MS 38*a*, is changed.

Figure 7:
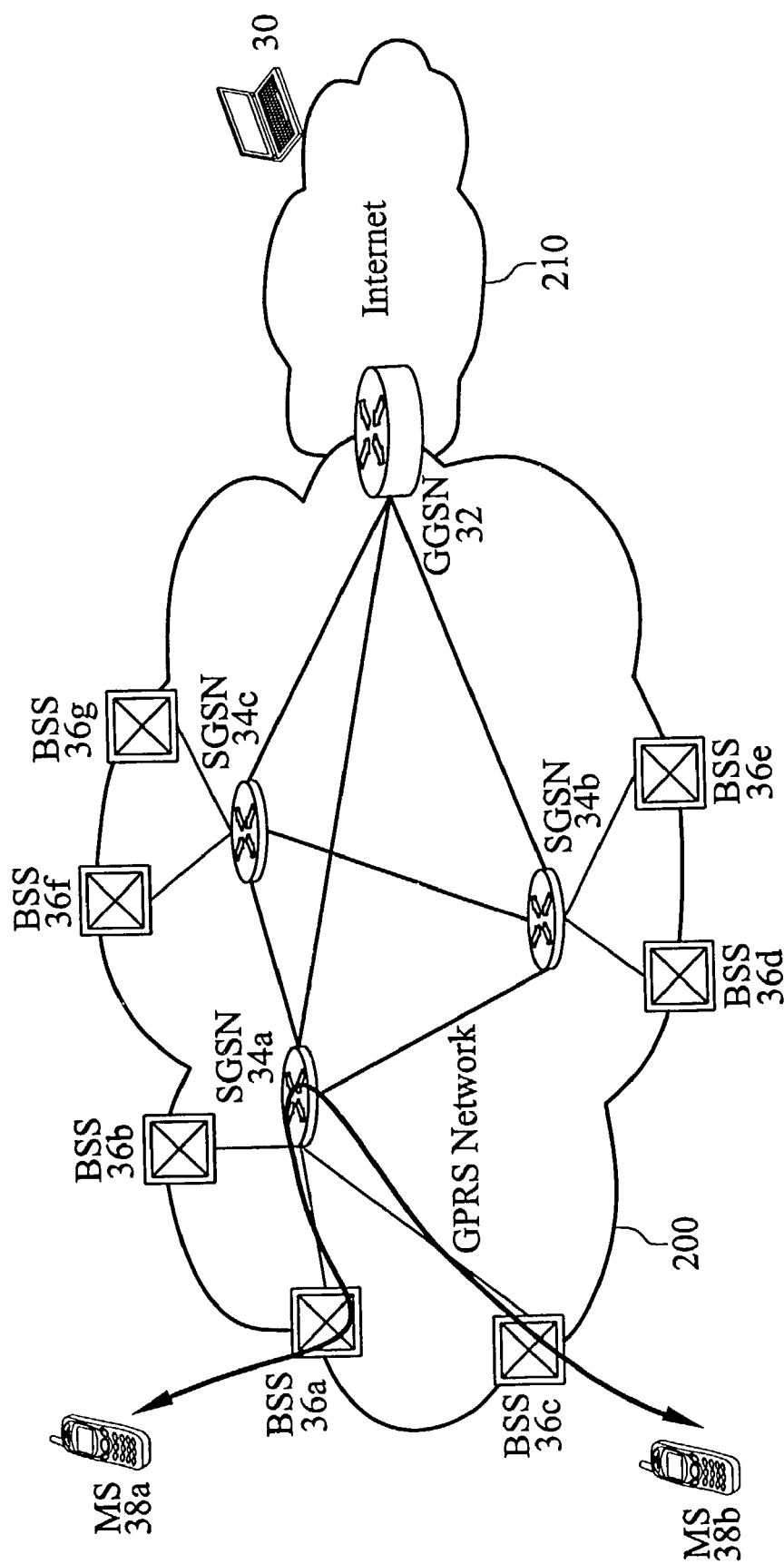
FIG. 7 is a second embodiment of an MS-to-MS communication according to the invention.

FIG. 7 is a second embodiment of an MS-to-MS communication according to the invention. As shown in FIG. 7, the network 200 is the same as that in FIG. 3 except that MS 38*a* connects to the network 200 through BSS 36*a*, MS 38*b* connects to the network 200 through BSS 36*c*, and both MSs 38*a* and 38*b* are serviced by SGSN 34*a*. After initiation between MSs 38*a* and 38*b* is complete by method of GGSN 32 (the same procedures as FIG. 4*a* but replacement of SGSN 34*b* with SGSN 34*a*), MSs 38*a* and 38*b* can communicate with one another. When MS 38*a* has data packets to MS 38*b*, MS 38*a* first sends data packets to SGSN 34*a* through BSS 36*a* and then SGSN 34*a* directly forwards the packets to MS 38*b* through BSS 36*c* because of the same servicing SGSN. Also, when MS 38*b* has data packets to MS 38*a*, MS 38*b* first sends data packets to SGSN 34*a* through BSS 36*c* and then SGSN 34*a* directly forwards the packets to MS 38*a* through BSS 36*a* because of the same servicing SGSN. Thus, such a data packet delivery method applied to GPRS networks is more effective than in FIG. 2*b*.

It is noted that in this embodiment, a signal packet sent by GGSN 32 is also applied to maintaining and ending bidirectional communications between MSs 38*a* and 38*b*.

In this embodiment, when SGSN servicing for MS 38*a* or MS 38*b* changes, procedures of the cited hand-off proceed. For example, if MS 38*b* has moved from SGSN 34*b*'s area just to SGSN 34*a*'s area, at this point, SGSN 34*b* is replaced by SGSN 34*a* and the same procedures are performed with reference to FIG. 6.

Figure 8:
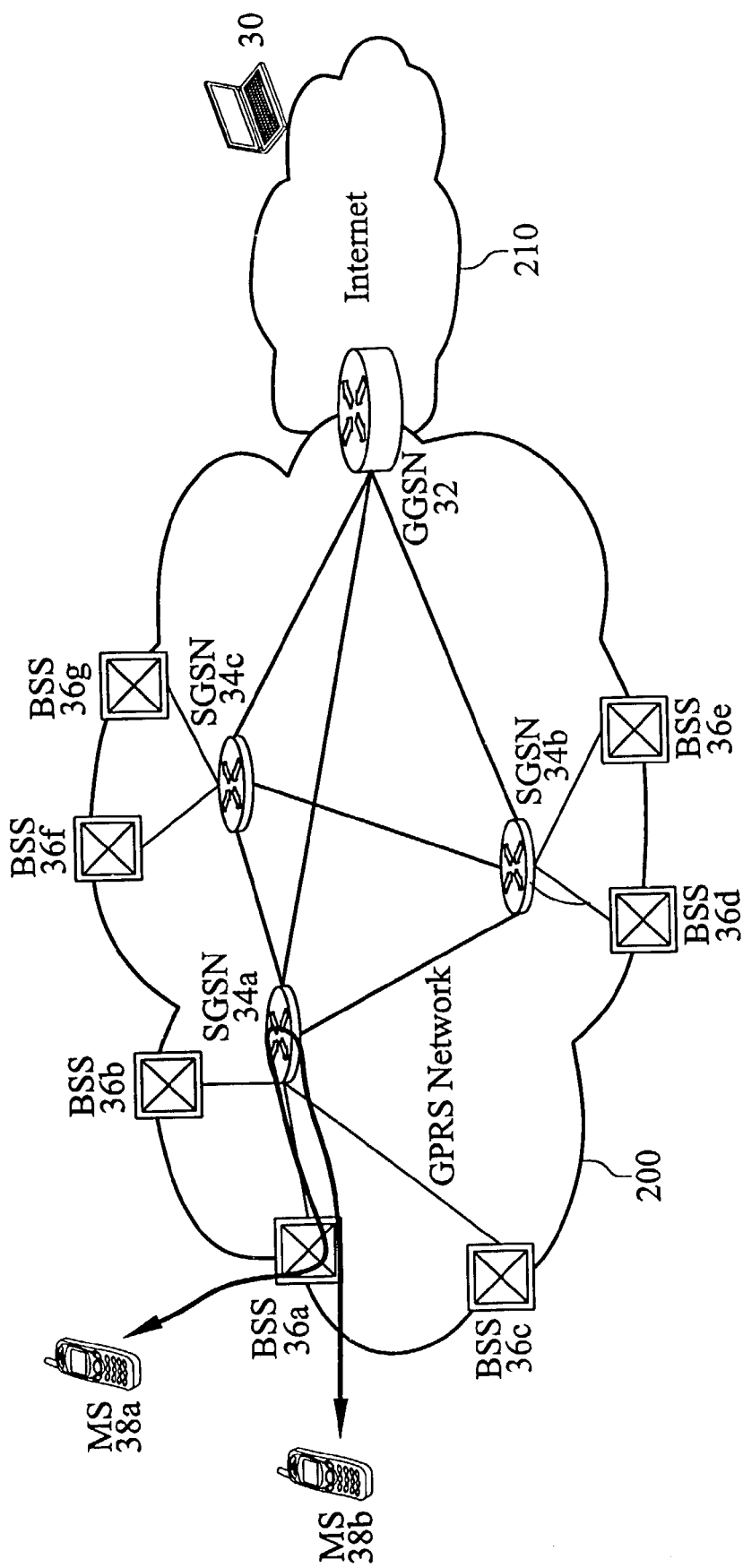
FIG. 8 is a third embodiment of an MS-to-MS communication according to the invention.

FIG. 8 is a third embodiment of an MS-to-MS communication according to the invention. As shown in FIG. 8, the network 200 is the same as in FIG. 3 except that MSs 38*a* and 38*b* connect to the network 200 through BSS 36*a* and are serviced by SGSN 34*a*. After initiation between MSs 38*a* and 38*b* is complete by method of GGSN 32 (the same procedures as FIG. 4*a* but replacing SGSN 34*b* with SGSN 34*a*), MSs 38*a* and 38*b* can communicate with one another. When MS 38*a* has data packets to MS 38*b*, MS 38*a* first sends data packets to SGSN 34*a* through BSS 36*a* and then SGSN 34*a* directly forwards the packets to MS 38*b* through BSS 36*a* because of the same servicing SGSN. Also, when MS 38*b* has data packets to MS 38*a*, MS 38*b* first sends data packets to SGSN 34*a* through BSS 36*a* and then SGSN 34*a* directly forwards the packets to MS 38*a* through BSS 36*a* because of the same servicing SGSN. Thus, this data packet delivery method applied to GPRS networks is more effective than in FIG. 2*a*.

It is noted that in this embodiment, a signal packet sent by GGSN 32 is also applied to maintaining and ending bidirectional communications between MSs 38*a* and 38*b*.

In this embodiment, when SGSN servicing for MS 38*a* or MS 38*b* changes, procedures of the cited hand-off proceed. For example, if MS 38*b* has moved from SGSN 34*b*'s area just to SGSN 34*a*'s area, at this point, SGSN 34*b* is replaced by SGSN 34*a* and the same procedures are performed with reference to FIG. 6.

Figure 9:
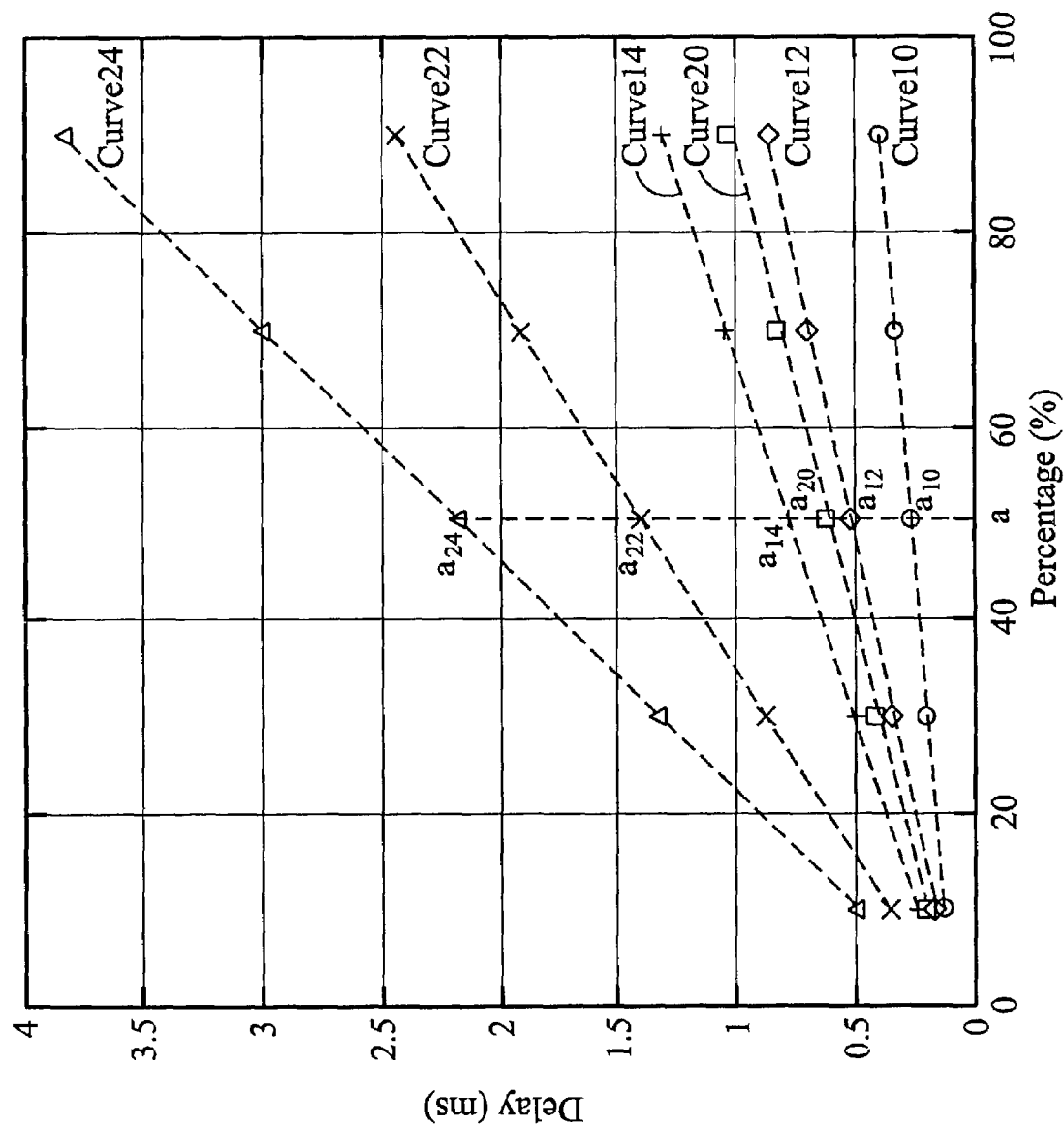
FIG. 9 is a diagram of an end-to-end delay simulation for MS-to-MS communication according to the invention.

FIG. 9 is a diagram of an end-to-end delay simulation for MS-to-MS communication according to the invention. In FIG. 9, simulation arranges 4 SGSNs, 8 GGSNs and 700,000 MSs with a transmission rate of 20 Kbps uniformly dispersed in BSSs. Additionally, a vertical axis represents a delay unit ms and a transverse axis represents a percentage of the MSs connecting to a target network. Curves 10, 12, 14 represent the delay result as the inventive method is applied when curves 20, 22, 24 represent the delay result as the prior method is applied. Curves 10 and 20 represent 20% of MS-to-MS communications currently proceeding. Curves 12 and 22 represent 50% of MS-to-MS communications currently proceeding. Curves 14 and 24 represent 80% of MS-to-MS communications currently proceeding.

As shown in FIG. 9, a delay comparison of the inventive and prior methods finds an obvious reduction by method of the inventive method. For example, the delay reduction is from about 0.7 ms in Curve 20 to about 0.25 ms in Curve 10 under a vertical line a. Additionally, when the inventive method is applied, compared to the prior art, the delay is sharply reduced with higher and higher network-connecting percentage and currently proceeding MS-to-MS communication percentage.

As shown in FIG. 9, upon the same network-connecting percentage, for example the cited line a, a value of a24-a14 is greater than values of a22-a12 and a20-a10. This means that the delay reduction is higher with higher currently proceeding MS-to-MS communication percentage as described above. It obviously proves from FIG. 9 that the inventive method is superior to the prior art.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A packet delivery method for packet radio networks, adapted to deliver packets between a first mobile station and a second mobile station in a packet radio network, where the first mobile station connects to the packet radio network through a first base station system (BSS) and die second mobile station connects to the packet radio network through a second base station system (BSS), comprising the steps of:

establishing a delivery path from the first mobile station (MS) to the second mobile station (MS) through the first base station system (BSS), a first Serving GPRS Support Node (SGSN), a Gateway GPRS Support Node (GGSN), a second Serving GPRS Support Node (SGSN) and the second base station system (BSS) when the first mobile station has a plurality of signal packets to the second mobile station;

sending a message with a first new tunneling identifier (TID) and an address of the first Serving GPRS Support Node (SGSN) by the Gateway GPRS Support Node (GGSN) to the second Serving GPRS Support Node (SGSN), notifying the second mobile station and the second Serving GPRS Support Node (SGSN) by the Gateway GPRS Support Node (GGSN) to start a bidirectional communication, sending a message with a second new tunneling identifier (TID) and an address of the second Serving GPRS Support Node (SGSN) by the Gateway GPRS Support Node (GGSN) to the first Serving GPRS Support Node (SGSN), notifying the first mobile station and the first Serving GPRS Support Node (SGSN) that an initiation of the bidirectional communication is completed by the Gateway GPRS Support Node (GGSN) and a delivery path is established from the first mobile station (MS) to the second mobile station (MS) through the first base station system (BSS), the first Serving GPRS Support Node (SGSN), the second Serving GPRS Support Node (SGSN) and the second base station system (BSS) when the first mobile station has a plurality of data packets to the second mobile station;

establishing a delivery path from the second mobile station (MS) to the first mobile station (MS) through the second base station system (BSS), the second Serving GPRS Support Node (SGSN), the Gateway GPRS Support Node (GGSN), the first Serving GPRS Support Node (SGSN) and the first base station system (BSS) when the second mobile station has a plurality of signal packets to the first mobile station; and sending a message with a third new tunneling identifier (TID) and an address of the second Serving GPRS Support Node (SGSN) by the Gateway GPRS Support Node (GGSN) to the first Serving GPRS Support Node (SGSN), notifying the first mobile station and the first Serving GPRS Support Node (SGSN) by the Gateway GPRS Support Node (GGSN) to start a bidirectional communication, sending a message with a fourth new tunneling identifier (TID) and an address of the first Serving GPRS Support Node (SGSN) by the Gateway GPRS Support Node (GGSN) to the second Serving GPRS Support Node (SGSN), notifying the second mobile station and the second Serving GPRS Support Node (SGSN) that an initiation of the bidirectional communication is completed by the Gateway GPRS Support Node (GGSN) and a delivery path is established from the second mobile station (MS) to the first mobile station (MS) through the second base station system (BSS), the second Serving GPRS Support Node (SGSN), the first Serving GPRS Support Node (SGSN) and the first base station system (BSS) when the second mobile station has a plurality of data packets to the first mobile station.

2. The packet delivery method of claim 1, wherein the GGSN maintains the data packets routine paths and manage the data packets delivered between the first mobile station and the second mobile station.

3. The packet delivery method of claim 1, wherein the GGSN connects between the interior of the packet radio network and an external network.

4. The packet delivery method of claim 3, wherein the external network is a TCP/IP or X.25 network.

5. The packet delivery method of claim 1, wherein the first SGSN and the second SGSN are different in the packet radio network.

6. The packet delivery method of claim 1, wherein the first SGSN and the second SGSN are the same in the packet radio network but the first mobile station and the second mobile station belong to different BSSs in the same SGSN.

7. The packet delivery method of claim 1, wherein the first SGSN and the second SGSN are the same in the packet radio network but the first mobile station and the second mobile station belong to the same BSS in the same SGSN.

8. A packet delivery method for packet radio networks, adapted to deliver packets between a first mobile station and a second mobile station in a packet radio network, where the first mobile station connects to the packet radio network through a first base station system (BSS) and the second mobile station connects to the packet radio network through a second base station system (BSS), comprising the steps of:

a linking step, to establish a bidirectional communication between the first mobile station and the second mobile station by method of a GGSN;

a notifying step, to provide a second SGSN servicing the second mobile station with a first SGSN's address and a first linking identifier of the first mobile station by the GGSN and to provide first SGSN servicing for the first mobile station with the second SGSN's address and a second linking identifier of the second mobile station by the GGSN; and a bidirectional communication step, to communicate between the first mobile station and the second mobile station through the first SGSN and the second SGSN, respectively, wherein when the first mobile station has a plurality of data packets to the second mobile station, the first mobile station first sends the data packets to the first BSS in the first SGSN, the first SGSN then forwards the data packets to the second SGSN by checking the first linking identifier, and the second SGSN finally forwards the data packets to the second mobile station through the second BSS by checking the first linking identifier; when the second mobile station has a plurality of data packets to the first mobile station, the second mobile station first sends the data packets to the second BSS in the second SGSN, the second SGSN forwards the data packets to the first SGSN by checking the second linking identifier, the first SGSN finally forwards the data packets to the first mobile station through the first BSS by checking the second linking identifier; and the GGSN sends a plurality of signal packets to maintain and end the data packets communicated between the first mobile station and the second mobile station.

9. The packet delivery method of claim 8, further comprising:

a hand-off step, to continue the bidirectional communication between the first mobile station and the second mobile station when the first mobile station moves to a third SGSN such that data packets between the first mobile station and the second mobile station are forwarded by the third SGSN and the second SGSN, respectively.

10. The packet delivery method of claim 9, wherein the first, second and third SGSNs are different in a Public Land Mobile Network (PLMN) included in the packet radio network.

11. The packet delivery method of claim 9, wherein the first SGSN is the same as the second SGSN but different from the third SGSN in the PLMN.

12. The packet delivery method of claim 9, wherein the second SGSN is the same as the third SGSN but different from the first SGSN in the PLMN.

13. The packet delivery method of claim 8, wherein the GGSN connects between the interior of the packet radio network and an external network.

14. The packet delivery method of claim 13, wherein the external network is a TCP/IP or X.25 network.

15. The packet delivery method of claim 8, wherein the first SGSN and the second SGSN are different in the packet radio network.

16. The packet delivery method of claim 8, wherein the first SGSN and the second SGSN are the same in the packet radio network but the first mobile station and the second mobile station belong to different BSSs in the same SGSN.

17. The packet delivery method of claim 8, wherein the first SGSN and the second SGSN are the same in the packet radio network but the first mobile station and the second mobile station belong to the same BSS in the same SGSN.

\* \* \* \* \*